Figure 1:
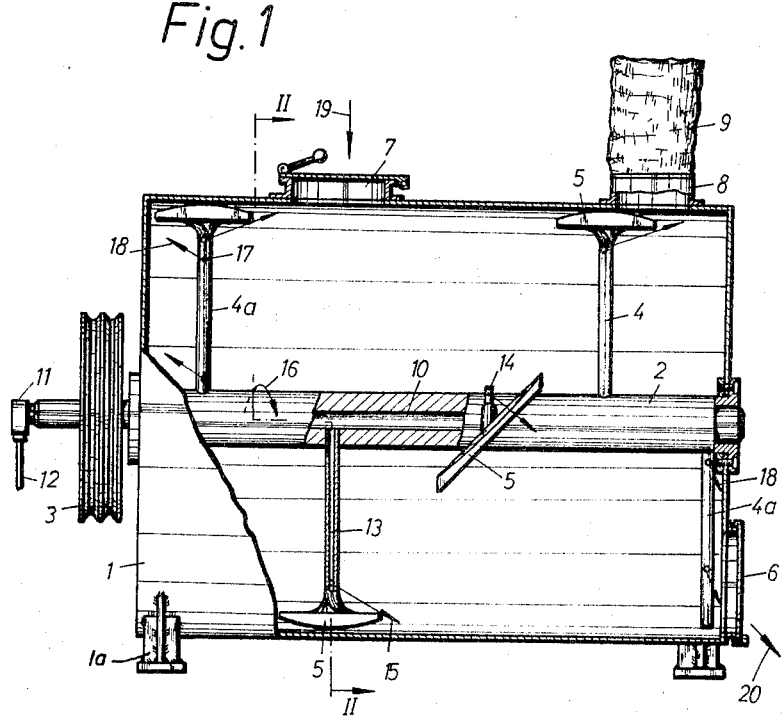
Figure 2:
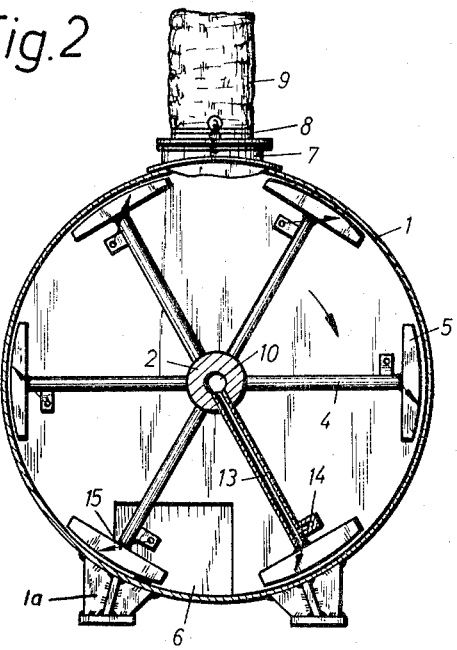

Sept. 20, 1966   W. LODIGE ETAL   3,273,863
MIXING APPARATUS
Filed April 21, 1965

3,273,863
MIXING APPARATUS
Wilhelm Lodige, 9c Elsener Strasse, Fritz Lodige, 9b Elsener Strasse, and Josef Lucke, 13 Im Lohfeld, all of Paderborn, Germany
Filed Apr. 21, 1965, Ser. No. 449,818
Claims priority, application Germany, Apr. 24, 1964, L 47,681
7 Claims. (Cl. 259—9)

The present invention is related to mixing apparatus, for example for powdered, granular or the like materials, comprising a centrally mounted, driven shaft to which, for example, mixing tools very nearly touching the walls of the vessel are secured by means of radially extending arms and further comprising means for cleaning the mixing container.

In factories where bulk materials are manufactured or processed, in mixing or other vessels, considerable difficulty is encountered in the complete emptying and cleaning of the mixing containers, particularly when the materials in question are prisonous, corrosive or represent dye-stuffs. If, for example in the dye-stuffs or plastics industry, the dye-stuffs are changed during the processing of materials, one mixer frequently has to be cleaned two to three times a day. Considerable expense and time is involved in the cleaning of the mixing containers and of the other vessels used to transport and store the materials.

It is therefore an object of the present invention to provide mixing apparatus for such materials comprising simple and effective cleaning means and, thus, to provide improved mixing apparatus.

Further objects of the present invention and advantages thereof will become apparent as the description proceeds.

It is known that mixing, storage and transport containers may be flushed manually by means of a compressed air gun in order to empty them completely and to clean them. It is also known to provide small openings in the wall of the vessel and to flow compressed air through these openings into the vessel, so as to detach or remove any accumulation of the material in the vessel from its walls. Unfortunately, such openings or nozzles which, in most cases, are fixedly arranged, only direct the jet of air towards the same area of the wall. In addition, the jet of air has to travel a considerable distance from the nozzle orifice to that area of the wall which it flushes, as a result of which its effectiveness is reduced. If several openings are provided, the jets of air do nöt displace the accumulations or lumps of material which they have detached into the next jet of air and so on towards the discharge opening of the container. In fact, most of the detached particles of material are only whirled around, and after the compressed air supply has been shut off, settle over other areas of the walls before descending to the bottom of the container. The greater the capacity of the vessel, the more difficult it is to empty the vessel completely and hence to clean it, quite apart from the unhealthy nature of this operation as far as the maintenance staff are concerned.

In addition, it is known to flush out vessels or containers by introducing the compressed air through nozzles into the containers which are rotated by the impact, as is the case with rotating water-sprinkling nozzles. In many cases, containers are even flushed with the aid of air hoses. Unfortunately, large openings are required in order that the inner wall of the container may be reached.

In this case, cleaning can only be carried out with the raising of dust in fairly large quantities which, in many cases, is not possible. At the same time, there is the disadvantage that the dust which is raised settles on surfaces which have already been cleaned.

Finally, it is also known that mixing vessels may be manually cleaned with cloths. For this purpose, the maintenance engineer has to step into the vessel. The time required for this method of cleaning is so considerable that production costs are raised very substantially in the event of frequent dye changes. For this reason, economical use of a mixing vessel or the like which has to be cleaned by hand is not possible in the case of processes requiring frequent changes of dyestuff.

The mixing apparatus according to the present invention comprises means by means of which the mixing vessel or other containers for storing and transporting materials for mixing may be cleaned quickly and effectively. The apparatus has a drum-shaped or cylindrical vessel comprising a centrally driven shaft to which mixing or other tools are secured by means of radially arranged supporting arms in such a manner as very nearly to touch the inner surface of the vessel; the shaft as well as, most preferably, the supporting arms have a central passage or bore extending lengthwise therethrough, through which compressed air, gas or liquid can be supplied, the said bore opening into one or more nozzles which are directed at an acute angle to the inner surface of the vessel and towards the discharge opening of the vessel. In another, less preferred embodiment the mixing means are arranged so as to be rotatable in a plane vertical to the axis of the cylindrical container by separate means, for instance are arranged on separate supporting arms arragned radially extending from the drive shaft. In these ways, it is possible completely to clean the walls of the mixing container in the shortest possible time after the greater part of its contents has been emptied through the discharge opening, for example by means of the mixing tools effective only in one direction. At the same time, lumps of the material adhering to the walls of the vessel are also removed.

In the practical application of the inventon, the nozzles are arranged helically distributed in the vessel. This ensures that, on its way to the discharge gate, the material detached from the wall by the individual jets of air or other fluid is continuously taken up and moved a stage further by new, rotating jets of air. In a most preferred embodiment the nozzles are arranged in pipe sockets or the like on the rear side of arms carrying the nozzle means and the bores of the nozzles open laterally and are each directed at an angle of, for example and preferably, 45° relative both to the vessel wall having the discharge opening and to the direction in which the mixing tools rotate. The air jets in this preferred embodiment precede the rotating mixing tools and, at the same time, urge the detached accumulations of material towards the discharge opening. In order, on the other hand, to enable the individual jets of air to impinge as effectively as possible on the walls of the vessel, the longitudinal axes of the nozzles are inclined at an angle of about 30° to the surface of the inner wall of the vessel. This ensures that the jets of air strike the wall of the container with sufficient energy and, at the same time, sweep over a sufficiently large area. If the jets of fluid were directed too steeply on to the walls of the vessel, the area effectively covered by them would be too small. If, on the other hand, the jets of fluid were to strike the walls of the mixing container at too wide an angle they would only be able to remove part of the material adhering to the walls, or might not be able to remove any of it at all.

In one preferred embodiment of the invention, each supporting arm for the mixing tools is formed with a central bore which communicates with the bore in the drive shaft and to which at least one nozzle is connected. In this way, the nozzles may be arranged as close as possible to the wall of the mixing container. In this case, nozzle tips are preferably provided on pipe sockets or the like at the rear side of the supporting arms as to their direction of rotation and are connected with the bores in the supporting arms. One nozzle tip is arranged on each supporting arm just above the mixing tool fixed to its end. This nozzle tip is therefore situated in a zone which is hardly occupied during the mixing operation, i.e. in a zone in which there is only a small amount of material or even a marked vacuum. This prevents the nozzle orifices inclined frontwards at an acute angle from becoming blocked with the material being mixed.

In addition, several nozzle tips may be arranged at intervals at least on those arms rotating nearest the end walls of the mixing vessel, the longitudinal axes of which, seen in the direction of rotation, extend obliquely forwards and at an acute angle to the end walls. In this way, the end walls of the container may also be effectively and quickly cleaned. However, those nozzles which are arranged close to the mixing tools on the supporting arms are so directed as to point towards the discharge opening, in which case it would not matter whether the discharge opening were situated in the middle of the container or in one of its end walls. This latter embodiment is, however, preferred in practice.

Each nozzle tip may preferably be detachable and adjustably arranged on its supporting arm. In this way, assembly and correct positioning of the nozzle tips are made easier. In addition, each of the nozzle tips may be quickly and easily replaced in the event of damage or the like.

The mixing vessel itself may be provided with an outlet socket or vent for the compressed air to which a filtering bag or the like filter means preferably is connected. In this way, the compressed air used to clean the vessel is prevented from entraining any dust it might have raised into the surrounding space. On the other hand, none of the material to be mixed is lost by using the filtering bag. If the filtering bag is provided, the discharge opening of the vessel may be closed during the cleaning operation.

The apparatus according to the invention operates as follows:

After the vessel, for example a mixing vessel, has been emptied in the usual way, in which case the mixing tools will have pushed or forced about 99% of the vessel contents out of the discharge opening, a suitable fluid such as air under a pressure of, for instance, 5 to 10 atms. is admitted through a valve which remains open for some 10 to 60 seconds, passes through the bores in the shaft and in the supporting arms to the nozzles and is blown out through their orifices while rotating. In this way, the mixing container is thoroughly cleaned and completely emptied. With certain kinds of material, it may even be of advantage to introduce the air at intervals. The mixing apparatus according to the invention may further be used to dry the material being mixed in the vessel by blowing hot air or the like into the vessel, in which case the hot air may be led out through the filtering bag. Finally, it would even be possible to use the proposed apparatus for moistening the material being mixed in the vessel. The periods of treatment with compressed air, drying air or with a liquid depend entirely upon the nature of the materials being processed.

A preferred embodiment of the invention is illustrated diagrammatically in the accompanying drawings in which:

FIG. I is a longitudinal section through a mixing apparatus according to the invention and FIG. II is a cross-section through the apparatus shown in FIG. I.

The drawings illustrate a mixing container 1 which is supported on legs 1a or in any other suitable way. Arranged centrally in the vessel 1 is a drive shaft 2 which is rotatably supported in the end walls of the vessel by means of bearings which are not shown in detail The shaft 2 is driven by means of a pulley 3 or the like from a motor (not shown). Supporting arms 4 for paddle-like mixing tools 5 are arranged at intervals on the shaft 2, being distributed helically around it. The mixing tools 5 are inclined in such a way that they feed the material being mixed in the vessel towards a closeable discharge opening 6 formed in one end wall of the vessel. The mixing tools 5 are so arranged as to move closely around the wall of the vessel 1, although there is a certain distance between them and the wall. At the end of the mixing operation, the apparatus according to the invention moves any accumulations of material on the walls of the vessel towards and then through the discharge opening 6.

Arranged on top of the vessel 1 is a closeable filling socket 7 through which the material to be mixed is fed into the mixing container. In addition, an outlet socket or vent 8 for compressed air is arranged on the top of the vessel 1. Connected to this socket 8 is a filtering bag 9. This filtering bag removes any dust particles and the like from the compressed air issuing from the vessel 1.

Formed in the shaft 2 is a central bore 10 which is closed at one end, the right-hand end in FIG. I. Provided at the other end of the shaft is an air connection 11 through which the air under a pressure of, for example 5 to 10 atms. is delivered from a compressed air source (not shown) by way of a pipe 12 into the bore 10.

Formed in the supporting arms 4 for the mixing tools 5 are axial bores 13 which extend lengthwise up to the outer end of the supporting arms 4. The bores 13 are closed at the outer end, for example by the mixing tools 5. At the other ends, however, the bores 13 communicate with the bore 10 in the shaft 2. In this way, the compressed air forced into the bore 10 is able to pass into the bores 13. One nozzle tip 14 with a lateral orifice is provided on the lower end of each of the supporting arms 4, as is particularly apparent from FIG. II. The orifice or the jet of each nozzle tip 14 is so directed that the compressed air is blown out through the bores 13 in the direction of the arrow 15 obliquely towards the wall of the vessel and obliquely forwards and, in addition, towards the discharge opening 6. As is particulary apparent from FIG. I, each of the nozzle tips 14, seen in the direction of rotation of the mixing tools as indicated by the arrow 16, is situated behind the inclined mixing tools 5. In this way, the nozzle tips are situated in a zone in which there is practically no material, even during the mixing operation, so that the nozzles are prevented from becoming blocked with the material being mixed. Provided on the supporting arms 4a rotating near the end walls of the vessel are additional nozzles 17 which are so directed that the compressed air issuing from them strikes the container end wall in the direction of the arrow 18, so that any accumulations of the material being mixed may be removed from this wall, too. The arrow 19 indicates the direction in which the material to be mixed is introduced into the vessel 1, whilst the arrow 20 indicates the direction in which the mixed material may be emptied from or forced out of the vessel through the discharge opening 6.

In the mixing apparatus according to the invention comprising, in combination, means for cleaning the mixing vessel, compressed air or even any desired fluid such as liquid may be used to clean the vessel. In addition, the material introduced into the vessel may be dried with hot air passed through the apparatus or may be moistened by means of a liquid likewise passed through the apparatus.

What we claim is:

1. A mixing apparatus comprising, in combination, a cylindrical container having a closeable inlet opening in its upper part and a closeable outlet opening in its lower part, a rotatable drive shaft extending coaxially through said container and having a central bore extending lengthwise therethrough, radially extending supporting arms on said shaft, said supporting arms having a central bore extending lengthwise therethrough and said bores communicating with the central bore of said drive shaft, mixing means at the outer ends of said supporting arms, said mixing means extending with their outer edges close to the inside wall of said container, nozzle means in the rear side of said arms for ejecting a jet of fluid, said nozzle means being arranged in a pipe socket at the rear side of said arms as to the direction of rotation and communicating with the central bore in said supporting arm and being arranged with their bore at an angle of about 45° both to the inner surface of said container and to the direction of rotation of said mixing means and being directed towards the outlet opening of said container.

2. A mixing apparatus comprising, in combination, a cylindrical container having a closeable inlet opening in its upper part and a closeable outlet opening in its lower part, a rotatable drive shaft extending coaxially through said container and having a central bore extending lengthwise therethrough, radially extending supporting arms on said shaft, said arms having a central bore extending lengthwise therethrough and said bores communicating with the central bore of said shaft, mixing means at the outer ends of said supporting arms, said mixing means extending with their outer edges close to the inside wall of said container, nozzle means in the rear side of said supporting arms for ejecting a jet of fluid, said nozzle means being arranged in a pipe socket at the rear side of said arms as to the direction of rotation and communicating with the central bore in said supporting arm and being arranged with their bore at an angle of about 30° to the inner surface of said container and being directed towards said outlet opening of said container.

3. A mixing apparatus comprising, in combination, a cylindrical container having a closeable inlet opening in its upper part and a closeable outlet opening in its lower part, a rotatable drive shaft extending coaxially through said container and having a central bore extending lengthwise therethrough, radially extending supporting arms on said shaft, said arms having a central bore extending lengthwise therethrough and said bores communicating with the central bore of said shaft, mixing means at the outer ends of said supporting arms, said mixing means extending with their outer edges close to the inside wall of said container, nozzle means in the rear side of said arms for ejecting a jet of fluid, said nozzle means being arranged in a pipe socket at the rear side of said arms as to the direction of rotation and communicating with said bore in said supporting arms and being arranged with their bore at an acute angle both to the inner surface of said container and to the direction of rotation and being directed towards said outlet opening of said container.

4. A mixing apparatus comprising, in combination, a cylindrical container having a closeable inlet opening in its upper part and a closeable outlet opening in its lower part, a rotatable drive shaft extending coaxially through said container and having a central bore extending lengthwise therethrough, radially extending supporting arms on said shaft, said arms having a central bore extending lengthwise therethrough and said bores communicating with the central bore of said shaft, mixing means at the outer ends of said supporting arms, said mixing means extending with their outer edges close to the inside wall of said container, nozzle means in the rear side of said arms for ejecting a jet of fluid, said nozzle means being arranged in a pipe socket at the rear side of said arms as to the direction of rotation close to said mixing means and said nozzle means communicating with said bore in said supporting arm and being arranged with their bore at an acute angle to the inner surface of said container and directed towards said outlet opening of said container.

5. A mixing apparatus comprising, in combination, a cylindrical container having a closeable inlet opening in its upper part and a closeable outlet opening in its lower part, a rotatable drive shaft extending coaxially through said container and having a central bore extending lengthwise therethrough, radially extending supporting arms on said shaft, said supporting arms having a central bore extending lengthwise therethrough and said bores communicating with the central bore of said drive shaft, mixing means at the outer ends of said supporting arms, said mixing means extending with their outer edges close to the inside wall of said container, nozzle means in the rear side of said arms for ejecting a jet of fluid, said nozzle means being arranged detachably in a pipe socket at the rear side of said arms as to the direction of rotation and communicating with said bore in said supporting arms and being arranged with their bore at an acute angle to the inner surface of said container and directed towards said outlet opening of said container.

6. A mixing apparatus comprising, in combination, a cylindrical container having a closeable inlet opening in its upper part of a closeable outlet opening in its lower part, a rotatable drive shaft extending coaxially through said container and having a central bore extending lengthwise therethrough, radially extending supporting arms on said shaft, said supporting arms having a central bore extending lengthwise therethrough and said bores communicating with the central bore of said shaft, mixing means at the outer ends of said supporting arms, said mixing means extending with their outer edges close to the inside wall of said container, nozzle means in the rear side of said arms for ejecting a jet of fluid, said nozzle means being arranged in a pipe socket at the rear side of said arms as to the direction of rotation and communicating with said bore in said supporting arms and being arranged with their bore at an acute angle to the inner surface of said container and directed towards said outlet opening of said container, and an air exhaust vent in the upper part of said container, said vent having a filter means for retaining solid particles.

7. A mixing apparatus comprising, in combination, a substantially horizontally positioned cylindrical container having a closable inlet opening in its upper part and a closable outlet opening in its lower part, a rotatable drive shaft extending coaxially through said container and having a central bore extending lengthwise therethrough, radially extending supporting arms on said shaft, said arms having a central bore extending lengthwise therethrough and said bores communicating with the central bore of said shaft, mixing means at the outer ends of said supporting arms, said mixing means extending with their outer edges close to the inside wall of said container, nozzle means in the rear side of said arms for ejecting a jet of fluid, said nozzle means being arranged in a pipe socket at the rear side of said arms as to the direction of rotation, communicating with the central bore in said supporting arm and being arranged with their bore at an acute angle both to the inner surface of said container and to the direction of rotation and being directed towards said outlet opening of said container.

References Cited by the Examiner

UNITED STATES PATENTS

| | | | |
|---|---|---|---|
| 3,020,025 | 2/1962 | O'Mara | 259—109 |
| 3,138,167 | 6/1964 | Fisher | 259—9 |
| 3,162,428 | 12/1964 | Lodige et al. | 259—9 |

WALTER A. SCHEEL, *Primary Examiner.*

WILLIAM I. PRICE, *Examiner.*

R. W. JENKINS, *Assistant Examiner.*